(12) United States Patent
Ohtani et al.

(10) Patent No.: US 6,470,050 B1
(45) Date of Patent: Oct. 22, 2002

(54) IMAGE CODING APPARATUS AND ITS MOTION VECTOR DETECTION METHOD

(75) Inventors: Akihiko Ohtani, Mino; Takaaki Shingo, Katano, both of (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/544,546

(22) Filed: Apr. 6, 2000

(30) Foreign Application Priority Data

Apr. 9, 1999 (JP) .......................................... 11-102243

(51) Int. Cl.[7] .............................................. H04N 7/36
(52) U.S. Cl. ................... 375/240.16; 348/699
(58) Field of Search ...................... 375/240.16, 240.17; 348/699; H04N 7/36

(56) References Cited

U.S. PATENT DOCUMENTS 5,430,487 A * 7/1995 Naimpally ................... 348/699
5,565,922 A * 10/1996 Krause ........................ 348/699

FOREIGN PATENT DOCUMENTS

| JP | 7-212762 | 8/1995 |
| JP | 8-9385 | 1/1996 |
| JP | 10-108199 | 4/1998 |
| JP | 10-210473 | 8/1998 |

* cited by examiner

*Primary Examiner*—Howard Britton
(74) *Attorney, Agent, or Firm*—Parkhurst & Wendel, LLP

(57) ABSTRACT

The present invention provides an image coding apparatus and its motion vector detection method, which can reduce a system cost also when the throughput of image data is increased. The image coding apparatus of the present invention comprises a search range frame memory 40 for outputting a search range for motion vector detection, a coding target frame memory 50 for outputting a coding target block, and a motion compensation unit 210 for performing motion compensation by using the coding target block which is input from the coding target frame memory 50 via a second data bus and the search range for the motion vector detection, which is input from the search range frame memory 40 via a first data bus, and obtaining a candidate block having a highest correlation with the coding target block in the search range.

15 Claims, 10 Drawing Sheets

Fig.9 (a)
| pixel value | |0 1 1 0 |0 9 1 8 |9 9 8 0 |0 |
|---|---|
| | v v v v v v v v v v v v |
| |difference between adjacent pixel values | | 1 0 1 0| 9 8 7 1| 0 1 8 0| |
Fig.9 (b)
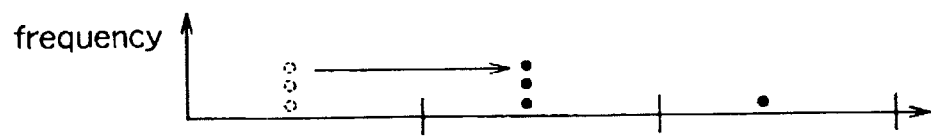
Fig.9 (c)
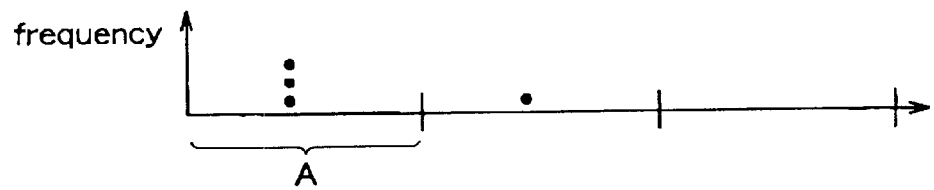

IMAGE CODING APPARATUS AND ITS MOTION VECTOR DETECTION METHOD

FIELD OF THE INVENTION

The present invention relates to an image coding apparatus which uses motion compensation inter-frame prediction and its motion vector detection method and, more particularly, to an image coding apparatus and its motion vector detection method according to a structure using an image coding LSI.

BACKGROUND OF THE INVENTION

As a method for realizing the motion compensation inter-frame prediction, there is a method of reducing temporal redundancy by using a motion vector as information which indicates from which position in an image one before a present image, a part of the present image is moved. As a method of extracting this motion vector, there is a block matching method.

FIG. 8 is a diagram for explaining the principle of the block matching method. According to this method, a frame image to be coded as a target of coding is compared with a search range frame image in which a motion vector is searched. Then, a best match block 902 which is the most similar to a coding target block 906 in a frame to be coded 905, i.e., a block having an evaluation value which has the highest correlation is extracted from the search range in a search range frame 903, thereby detecting a motion vector 901. In this method, the wider the search range is, the more easily the similar block is detected.

As a prior art image coding apparatus, there is an apparatus which internally contains all coding circuits including a motion search unit for detecting a motion vector, thereby to reduce the number of components.

For example, Japanese Published Patent Application No.10-108199 discloses an apparatus for executing inter-frame image prediction coding. This apparatus comprises an image input unit, a motion search unit, a pixel value arithmetic unit, a variable length coding unit, a code output unit, a frame memory, a frame memory control unit connected to the frame memory, a control processor, and a host interface. The frame memory control unit decides time-shared data transfer in each prescribed processing unit period by the same scheduling method.

To be specific, as shown in FIGS. 6 and 7 of Japanese Published Patent Application No.10-108199, the frame memory control unit has a frame index register internally. By controlling this frame index register with the control processor, the control unit changes an area for writing image data which is input by the image input unit or an area for writing a predicted image which is obtained by the pixel value arithmetic unit. This Patent Application No.10-108199 clearly describes that an image coding apparatus comprising fewer components, for example, an image coding apparatus comprising one outboard memory can be realized with this construction.

A bandwidth required for transferring data of a coding target of a common SD (standard density) image (720 pixels×480 lines×30 frames/sec) of NTSC is given by Expression 1. In addition, a bandwidth required for transferring data of a search range in the case of a search range area of 48 pixels×48 lines (±16 pixels in the horizontal direction and ±16 lines in the vertical direction) is given by Expression 2.

$$((720 \text{ pixels} \times 480 \text{ lines} + 360 \text{ pixels} \times 240 \text{ lines} \times 2) \times 30 \text{ frames/sec} \times 8 \text{ bits/pixel}) \times 2 = 0.25 \text{ Gbps} \quad \text{(Expression 1)}$$

$$((720 \text{ pixels} \times 480 \text{ lines} + 360 \text{ pixels} \times 240 \text{ lines} \times 2) \times 30 \text{ frames/sec} \times 8 \text{ bits/pixel}) + ((720 \text{ pixels} \times 480 \text{ lines}) \times (48 \text{ pixels} \times 48 \text{ lines})/(16 \text{ pixels} \times 16 \text{ lines}) \times 30 \text{ frames/sec} \times 8 \text{ bits/pixel}) \times 2 + (360 \text{ pixels} \times 240 \text{ lines} \times 2) \times 30 \text{ frames/sec} \times 8 \text{ bits/pixel}) \times 2 = 1.7 \text{ Gbps} \quad \text{(Expression 2)}$$

Expression 1 shows the bandwidth in consideration of brightness components and color difference component (Cb, Cr). The last multiplier 2 shows writing and reading to and from the external memory. The first term of Expression 2 shows writing of a predicted image. The second term shows reading of a search range (predicted image) (brightness components only). The third term shows reading of color difference components of the predicted image. The multipliers 2 in the second and third terms of Expression 2 are caused by bidirectional inter-frame prediction, which is described later. In the prior art, all of these are realized by the transfer to/from the external memory which is connected with one data bus.

For example, as described in IEEE JOURNAL OF SOLID-STATE CIRCUITS, VOL.32, NO.11, NOVEMBER 1997, when 32-bit width data is transferred in the 81-MHz operation, the bandwidth is 2.6 Gbp. In this case, there is an allowance about 1.5 times as large as required data transfer amount (1.7 Gbp). They are practical transfer rate and data width at this stage, considering codes at the output stage being temporarily buffered in the external memory, overhead of data transfer, and LSI cost depending on the number of pins greatly.

As described above, the prior art image coding apparatus stores plural pieces of frame data such as a predicted image and search image in the outboard memory, and executes the image coding by the data transfer to/from the outboard memory. However, when the search range is extended to obtain a higher image quality or the throughput is increased like HD (high density) images (for example, 1920 pixels× 1152 lines×30 frames/sec), the bandwidth required for transferring data from the frame memory to a coding unit is dramatically increased. In this case, high-speed transfer or high parallel input is required to construct the image coding apparatus, whereby the system cost is increased due to an increased number of data pins.

Especially, in the motion vector detection process which is required for the image coding using the motion compensation inter-frame prediction, the detection of a block with high coding efficiency by performing pattern matching is required. Further, screens will be extended in the future and demands for higher definition and higher image quality will be growing accordingly. In order to meet these demands, the detection in a larger search range will be inevitably needed. Accordingly, the data transfer amount is significantly increased.

SUMMARY OF THE INVENTION

It is an object of the present invention to provide an image coding apparatus and its motion vector detection method, which can reduce the system cost also when the throughput of image data is increased.

Other objects and advantages of the present invention will become apparent from the detailed description and specific embodiments described are provided only for illustration since various additions and modifications within the spirit and scope of the invention will be apparent to those of skill in the art from the detailed description.

An image coding apparatus according to a 1st aspect of the present invention comprises: an image input unit; a coding unit including a motion compensation unit for performing the motion compensation inter-frame prediction, a code generation unit for coding an output result of the motion compensation unit, and an image reproduction unit for reconstructing an image on the basis of a code generation result; a code output unit for outputting a code generated by the coding unit; a search range frame memory for containing the output of the image reproduction unit; a coding target frame memory for containing frame data which is output by the image input unit; a first data bus for performing data transfer from the search range frame memory to the coding unit; and a second data bus for performing data transfer from the coding target frame memory to the coding unit, and the motion compensation unit selects a block in a search range, using the search range which is input from the search range frame memory via the first data bus and a coding target block which is input from the coding target frame memory via the second data bus, and performs the motion compensation. Therefore, the transfer amount is dispersed and the frame memories are selected according to the transfer amount or memory capacity, whereby an effective construction can be realized. Accordingly, even when the throughput of image data is increased, a rise in the transfer frequency or an increase in the number of data pins is suppressed, whereby an image coding apparatus having a lower system cost can be provided.

According to a 2nd aspect of the present invention, in the image coding apparatus of the 1st aspect, the motion compensation unit and the search range frame memory are integrated on one chip. Therefore, the data amount transferred from the coding target frame memory as an outboard memory is reduced, whereby an image coding apparatus having a lower system cost can be provided.

According to a 3rd aspect of the present invention, in the image coding apparatus of the 1st aspect, a memory capacity of the coding target frame memory is larger than a memory capacity of the search range frame memory. Therefore, an image coding apparatus having a lower system cost can be provided by increasing a less expensive memory which does not require a higher-speed operation with relative to the search range frame memory.

An image coding apparatus according to a 4th aspect of the present invention comprises: an image input unit; a spare vector detection unit; a coding unit including a motion compensation unit for performing the motion compensation inter-frame prediction, a code generation unit for coding an output result of the motion compensation unit, and an image reproduction unit for reconstructing an image on the basis of a code generation result; a code output unit for outputting a code generated by the coding unit; a search range frame memory for containing the output of the image reproduction unit; a coding target frame memory for containing frame data output by the image input unit; a first data bus for performing data transfer from the search range frame memory to the spare vector detection unit and the coding unit; and a second data bus for performing data transfer from the coding target frame memory to the coding unit, and the spare vector detection unit selects a block in a search range, using the search range which is input from the search range frame memory via the first data bus and a coding target block which is input by the image input unit, and calculates a motion vector, and the motion compensation unit selects a block in a search range, using the search range which is input from the search range frame memory via the first data bus on the basis of the motion vector calculated by the spare vector detection unit and the coding target block which is input from the coding target frame memory via the second data bus, and performs the motion compensation. Therefore, data of the search range from the search range frame memory, which has a large transfer amount and is used in the motion compensation unit can be reduced, whereby the transfer amount from the search range frame memory can be reduced. Accordingly, a rise in the transfer frequency or an increase in the number of data pins is suppressed, whereby an image coding apparatus having a lower system cost can be provided. Besides, the coding target block is input to the spare vector detection unit directly from the image input unit, whereby addition of data buses or an increase in the transfer amount is suppressed and an increase in the number of data pins is suppressed. Accordingly, a rise in the cost can be suppressed.

An image coding apparatus according to a 5th aspect of the present invention comprises: an image input unit; a vector estimation unit; a coding unit including a motion compensation unit for performing the motion compensation inter-frame prediction, a code generation unit for coding an output result of the motion compensation unit, and an image reproduction unit for reconstructing an image on the basis of a code generation result; a code output unit for outputting a code generated by the coding unit; a search range frame memory for containing the output of the image reproduction unit; a coding target frame memory for containing frame data output by the image input unit; a first data bus for performing data transfer from the search range frame memory to the coding unit; and a second data bus for performing data transfer from the coding target frame memory to the coding unit, and the vector estimation unit calculates a motion vector from continuous first and second frame images which are successively input by the image input unit, and the motion compensation unit selects a block in a search range, using the search range which is input from the search range frame memory via the first data bus on the basis of the motion vector calculated by the vector estimation unit and a coding target block of the second frame image which is input from the coding target frame memory via the second data bus, and performs the motion compensation. Therefore, data of the search range from the search range frame memory, which has a large transfer amount and is used in the motion compensation unit can be reduced, whereby the transfer amount from the search range frame memory can be reduced. Accordingly, a rise in the transfer frequency or an increase in the number of data pins is suppressed and an image coding apparatus having a lower system cost can be provided. Besides, the frame image is input to the vector estimation unit directly from an image input unit, whereby addition of data buses or an increase in the transfer amount is suppressed and an increase in the number of data pins is suppressed. Therefore, a rise in the cost can be suppressed.

A motion vector detection method according to a 6th aspect of the present invention comprises: performing first motion vector detection using an input coding target block and a search range which is set for the coding target block in a frame image obtained according to the motion compensation inter-frame prediction, with predetermined search precision; and performing second motion vector detection using the coding target block which is temporarily stored after being input and a search range which is set in the frame image obtained according to the motion compensation inter-frame prediction on the basis of a motion vector detected by the first motion vector detection, with higher search precision than the predetermined search precision. Therefore, data of the search range which is used in the second motion vector detection can be reduced. Besides, the coding target block which is input directly is utilized in the first motion vector detection, whereby addition of data buses or an increase in the transfer amount is suppressed.

A motion vector detection method according to a 7th aspect of the present invention comprises: estimating a motion vector from continuous first and second frame images which are successively input; and detecting a motion vector using a coding target block in the second frame image, which block is temporarily stored after being input, and a search range which is set in a frame image obtained according to the motion compensation inter-frame prediction on the basis of the motion vector detected by the estimation of the motion vector. Therefore, data of the search range which is used in the motion vector detection can be reduced. Besides, the coding target block which is directly input is utilized in the motion vector estimation, whereby the addition of data buses or an increase in the transfer amount can be suppressed.

BRIEF DESCRIPTION OF THE DRAWINGS

FIGS. 9(a)–(c) are diagrams schematically illustrating an operation of a vector estimation unit of an image coding apparatus according to a third embodiment.

DETAILED DESCRIPTION OF THE PREFERRED EMBODIMENTS

Embodiment 1

When HD images are processed, an image coding apparatus according to a first embodiment utilizes a structure paying attention to two types of data which are stored in the conventional outboard memory and have different properties, divides one frame memory into memories for containing these two types of data, respectively, and further divides a data bus accordingly. To be specific, a memory for containing frame image data is divided into a search range frame memory which requires a high-speed operation while requiring only a small capacity and a coding target frame memory which requires only a low-speed operation while requiring a mass capacity, and a data bus of the coding target frame memory is separated from a data bus of the search range frame memory having a large transfer amount. Accordingly, respective features are efficiently utilized, whereby a low-cost system is provided.

Figure 1:
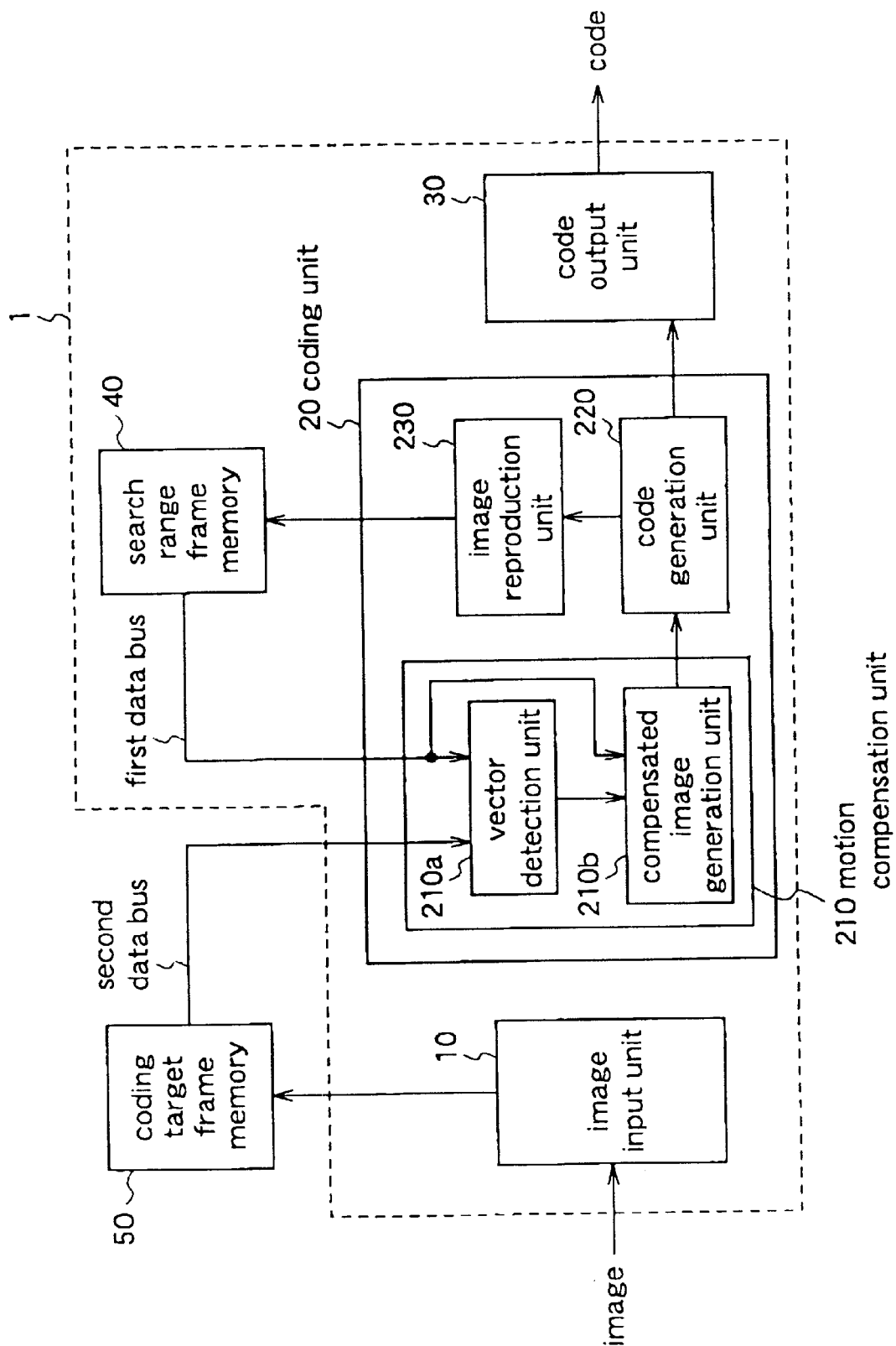
FIG. 1 is a block diagram illustrating an image coding apparatus according to a first embodiment of the present invention.

FIG. 1 is a block diagram illustrating the image coding apparatus of the first embodiment. In FIG. 1, reference numeral 1 designates a coding circuit for subjecting an image to a coding operation processing. Numeral 10 designates an image input unit. Numeral 20 designates a coding unit. Numeral 30 designates a code output unit. Numeral 40 designates a search range frame memory constituted by a DRAM, for example. Numeral 50 designates a coding target frame memory constituted by a SDRAM (synchronous DRAM), for example, and its capacity is larger than that of the search range frame memory. The coding unit 20 comprises a motion compensation unit 210 for performing motion compensation inter-frame prediction, a code generation unit 220 for coding an output result of the motion compensation unit 210, and an image reproduction unit 230 for reconstructing an image on the basis of a code generation result. Here, the coding circuit 1 is constructed within a chip different from that of the coding target frame memory 50. In addition, the search range frame memory 40 is constructed within the same chip as that of the coding circuit 1.

An input image is subjected to format transformation, filter processing and the like by the image input unit 10, and then written on the coding target frame memory 50. The written image is stored in the coding target frame memory 50 until its coding turn comes, and a coding target block in its coding turn is input to the motion compensation unit 210 via a second data bus. In addition, when the motion compensation inter-frame prediction is performed, a search range for the motion vector detection is input to the motion compensation unit 210 from the search range frame memory 40 via a first data bus. In the motion compensation unit 210, a vector detection unit 210a obtains, from the input search range and the input coding target block, a candidate block in the search range which has the highest correlation with the coding target block, and detects a motion vector. Thereafter, it decides a coding mode such as whether a difference between the candidate block and the coding target block is coded (non-intra coding) or the coding target block itself is coded (intra coding). Then, a compensated image generation unit 210b generates an image block according to the decided coding mode, from an output of the vector detection unit 210a and a frame image which is output from the search range frame memory 40, and outputs the generated image block to the code generation unit 220. In the code generation unit 220, the image block is subjected to discrete cosine transformation, quantization, and variable length coding, then transmitted to the code output unit 30, and output outside. Further, the code generation unit 220 outputs the data which was subjected to the discrete cosine transformation and quantization, to the image reproduction unit 230. The image reproduction unit 230 subjects the data to inverse quantization, inverse discrete cosine transformation or the like, then decodes an image (local decoding), and writes a frame image which is obtained by the motion compensation to the search range frame memory 40.

Figure 2:
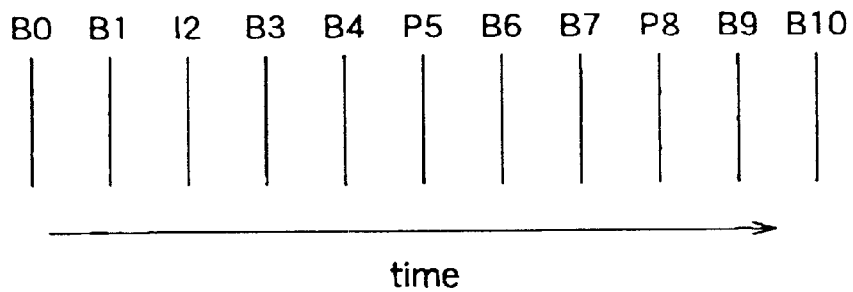
FIG. 2 is a diagram for explaining the outline of MPEG image coding.
Figure 3:
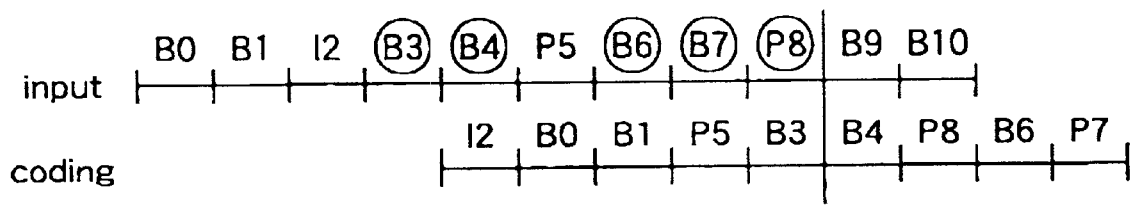
FIG. 3 is a diagram for explaining an order of coding images according to the MPEG image coding.

FIGS. 2 and 3 show an ordinary coding procedure according to MPEG as image coding standards. In FIG. 2, eleven frames, i.e., B0 to B10 are arranged in the time. sequence. "In" shows an intra-frame coded frame (I frame), "Pn" shows a forward inter-frame prediction coded frame (P frame), and "Bn" shows a bidirectional inter-frame prediction coded frame (B frame).

The intra-frame coding is a method of coding an image only with a coding target block without performing the inter-frame motion compensation, and the coding is performed by respective processings of discrete cosine transformation, quantization, and variable length coding. The forward inter-frame prediction coding is a coding method of performing the motion compensation inter-frame prediction for a temporally previous frame (I frame or P frame) as a search range frame. The bidirectional inter-frame prediction coding is a coding method of performing the motion compensation inter-frame prediction for temporally previous and subsequent frames (I frame or P frame) as search range frames.

FIG. 3 shows an order of inputting the respective frames (B0 to B10) and an order of coding the frames later. For example when B3 frame is to be coded, five frames (circled), i.e., B3, B4, B6, B7, and P8 are stored in the coding target frame memory 50 (P8 is being stored now). At this time, two frames, i.e., I2 and P5 are stored in the search range frame memory 40. Thus, the search range frame memory 40 contains fewer frames than the coding target frame memory 50. That is, a smaller capacity than that of the coding target frame memory 50 suffices.

Figure 4:
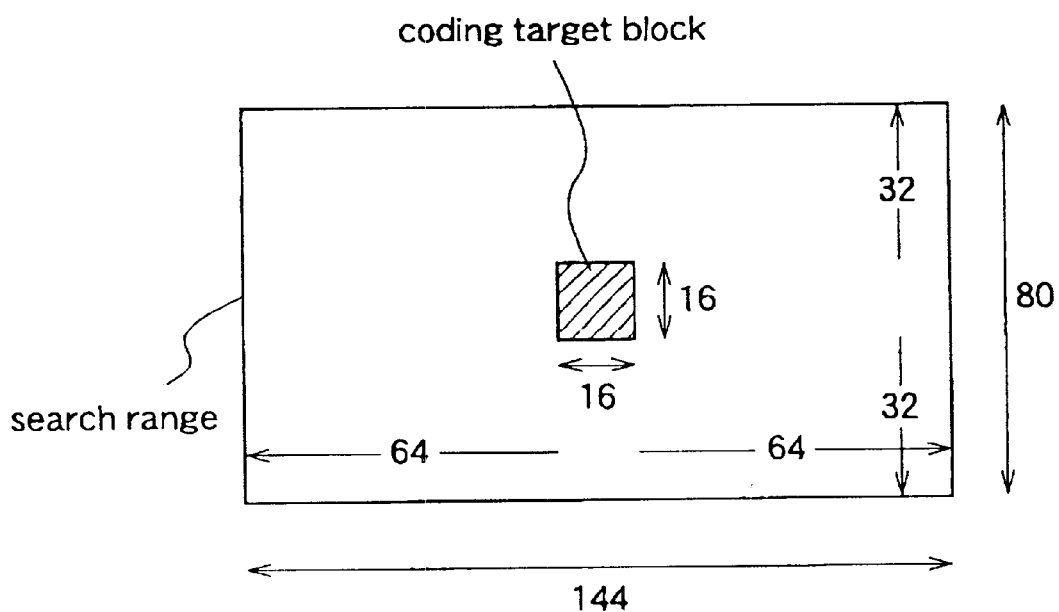
FIG. 4 is a diagram showing a coding target block and a search range of 144 pixels×80 lines.

In the present invention, the bus for performing data transfer from the coding target frame memory 50 is separated from the bus for performing data transfer from the search range frame memory 40. A bandwidth required for the data transfer from the coding target frame memory 50 in the case of HD images (for example, 1920 pixels×1152 lines×30 frames) is given by Expression 3. In addition, a bandwidth required for the data transfer from the search range frame memory 40 in the case of a search range area of 144 pixels×80 lines (±64 pixels in the horizontal direction and ±32 line in the vertical direction) as shown in FIG. 4 is given by Expression 4.

((1920 pixels×1152 lines+960 pixels×576 lines×2)×30 frames/sec×8 bits/pixel)×2=1.6

Gbp . . . bandwidth for coding target frame memory 50                                      (Expression 3)

((1920 pixels×1152 lines+960 pixels×576 lines×2)×30 frames/sec×8 bits/pixel)+((1920 pixels×1152 lines)×(144pixels×

80 lines)/(16 pixels×

16 lines)×30 frames/sec×8 bits/pixel)×

2+((960 pixels×576 lines×2)×30 frames/sec×

8 bits/pixel)×2=49 Gbps . . . bandwidth for search range frame memory 40         (Expression 4)

While the bandwidth of a NTSC (SD) image is 1.7 Gbps, the bandwidth of a HD image is significantly increased by about 30 times to 49 Gbps. When this HD image is transferred in a data width of 64 bit, at least 1 GHz is required, including overhead. In this case, the search range frame memory 40 can be constituted using a high-speed memory of 1 GHz-operation. However, there is no high-speed memory of 1 GHz-operation at present. Accordingly, in this first embodiment, the bus for the data transfer from the coding target frame memory 50 is separated from the bus for the data transfer from the search range frame memory 40.

Further, the search range frame memory 40 which has a larger transfer amount and is required to contain fewer frames (two frames) than the coding target frame memory 50 which is required to contain at least four frames is integrated with the coding circuit 1 including the motion compensation unit 210 on one chip. Accordingly, a bandwidth from the external memory (coding target frame memory 50) to the motion compensation unit 210 is reduced to 1.6 Gbps, which is the bandwidth for only the transfer from the coding target frame memory 50 as shown in Expression 3. Thereby, the bandwidth can be suppressed to the same level as that in the case of NTSC (SD) images. Therefore, additional data pins for extending a data width from the external memory are not required, whereby the image coding apparatus can be constructed without increasing the cost.

In addition, in the first embodiment, the structure in which the search range frame memory 40 is integrated with the coding circuit 1 on one chip (LSI) is utilized. Therefore, a transfer rate can be easily increased and a bandwidth of the first data bus can be easily expanded by expansion of the data width. Accordingly, the search range can be also extended, whereby the image quality is improved. Further, the first data bus is provided on the chip. Therefore, when the data width is expanded, a problem of an increased cost due to an increased number of data pins of the chip does not arise. Accordingly, the data width can be easily expanded to 128 bits or 256 bits, whereby the transfer frequency can be reduced.

A memory having a low transfer rate is usually not expensive. Since the transfer rate of the coding target frame memory 50 can be lower than that of the search range frame memory 40, the price per capacity of the coding target frame memory 50 is lower than that of the search range frame memory 40. Therefore, when one outboard memory is divided into the coding target frame memory 50 and the search range frame memory 40 as in the first embodiment, the coding target frame memory 50 having a larger capacity than that of the search range frame memory 40 can be obtained less expensively, whereby the image coding apparatus can be constructed without increasing the cost.

In addition, the coding target frame memory 50 is provided outside the chip on which the coding circuit 1 is provided. Therefore, the number of frames to be coded which can be stored in the memory can be easily increased by increasing a memory capacity, whereby plural times of coding processing or feedback of a coding state can be performed. Therefore, the image quality can be further increased.

In this first embodiment, the code generated by the coding unit 20 is directly output to the code output unit 30. However, the output of the coding unit 20 can be temporarily stored in an external memory and output via the code output unit 30 after adjusting an output timing of the code.

In addition, the case where the HD images are processed is described as an example in this first embodiment. However, this invention can be applied to images other than the HD images. For example, a working speed of a presently available high-speed SDRAM is approximately 166 MHz. When this SDRAM is used for data transfer of 32-bit width, an obtained bandwidth is only 5.3 Gbps at the maximum, i.e., about three times as large as 1.7 Gbps (bandwidth of SD images). In the above-described prior art, even when this high-speed SDRAM is used as a frame memory, an image approximately three times the size of the SD image can be coded with keeping a high image quality at the maximum. However, in this first embodiment, the bus for the data transfer from the coding target frame memory 50 is separated from the bus for the data transfer from the search range frame memory 40, and the search range frame memory 40 is integrated with the coding circuit 1 on one chip. Therefore, the image coding apparatus which can subject an image, which is larger than an image approximately three times the size of the SD image, to the image coding with keeping a high image quality can be realized without increasing the cost.

Embodiment 2

Figure 5:
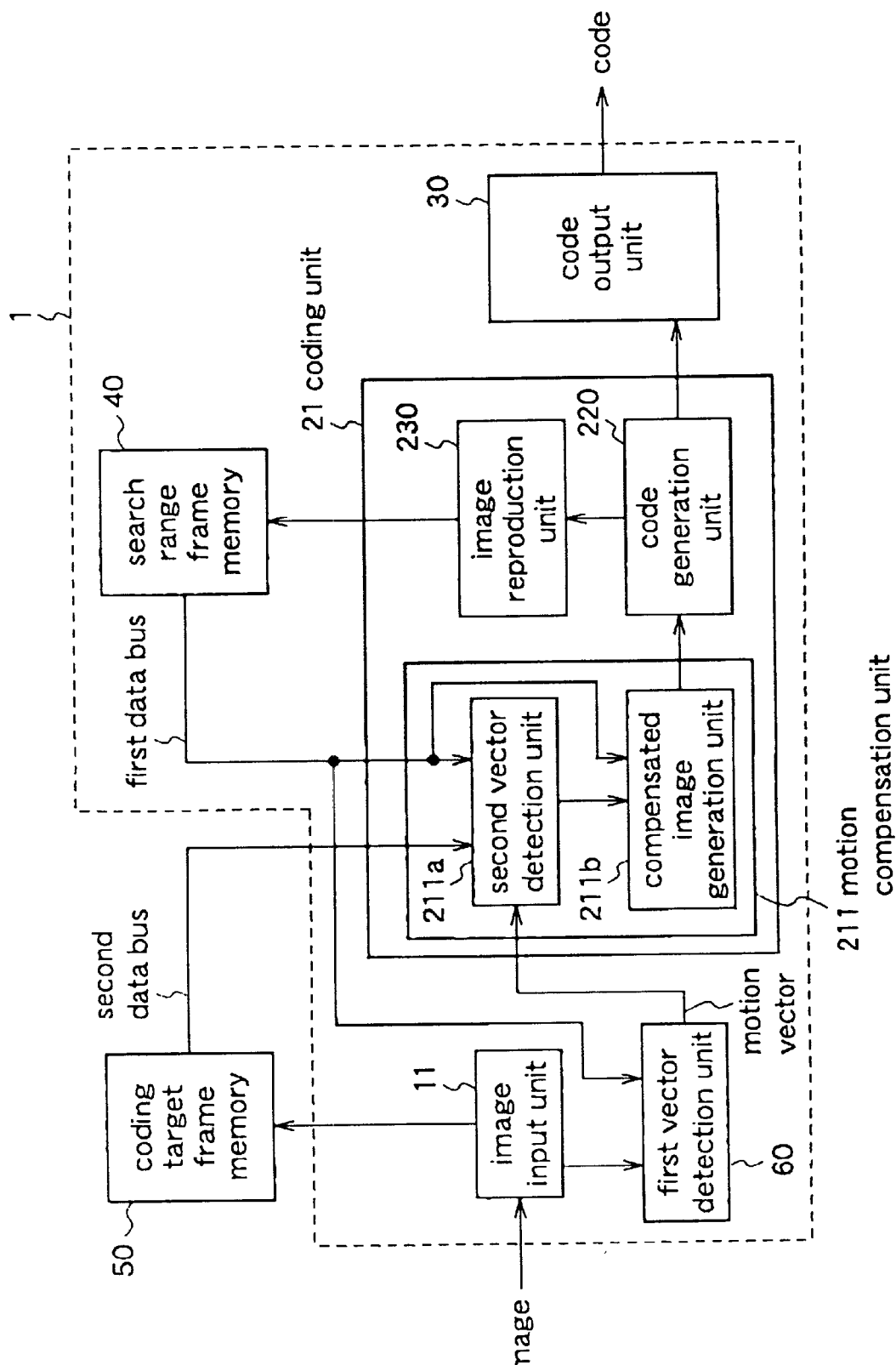
FIG. 5 is a block diagram illustrating an image coding apparatus according to a second embodiment of the present invention.

FIG. 5 is a block diagram illustrating an image coding apparatus according to a second embodiment of the present invention. In FIG. 5, the same reference numerals as those in FIG. 1 designate the same or corresponding parts. Numeral 11 designates an image input unit. Numeral 21 designates a coding unit. An image input from the image input unit 11 is directly input to a first vector detection unit 60, as well as image data from the search range frame memory 40 is input to the detection unit 60. The coding unit 21 comprises a motion compensation unit 211 for performing the motion compensation inter-frame prediction, a code generation unit 220 for coding an output result of the motion compensation unit 211, and an image reproduction unit 230 for reconstructing an image on the basis of a result of the code generation. The motion compensation unit 211 comprises a second vector detection unit 211a and a compensated image generation unit 211b. Other elements are the same as those in the first embodiment.

In this second embodiment, the transfer amount of data of a search range is reduced by two-step search of preliminarily calculating a motion vector at an input stage by the first vector detection unit 60, and obtaining a final motion vector by the second vector detection unit 211a in the motion compensation unit 211 according to the value of the motion vector.

An input image is subjected to the format transformation, filter processing and the like by the image input unit 11, and thereafter written on the coding target frame memory 50 as well as directly input to the first vector detection unit 60 for each coding target block. The first vector detection unit 60 detects a motion vector on the basis of the input of the coding target block from the image input unit 11 and a search range which is input from the search range frame memory 40, and outputs the motion vector to the motion compensation unit 211. The motion compensation unit 211 captures a search range from the search range frame memory 40 on the basis of the motion vector obtained by the first vector detection unit 60, performs motion vector detection in the second vector detection unit 211a with higher search precision than that in the motion vector detection in the first vector detection unit 60, and generates an image which was motion compensated by the compensated image generation unit 211b, from a result of the detection and a frame image stored in the search range frame memory 40, whereby the motion compensation is performed. Subsequent processes are the same as those in the first embodiment.

Figure 6:
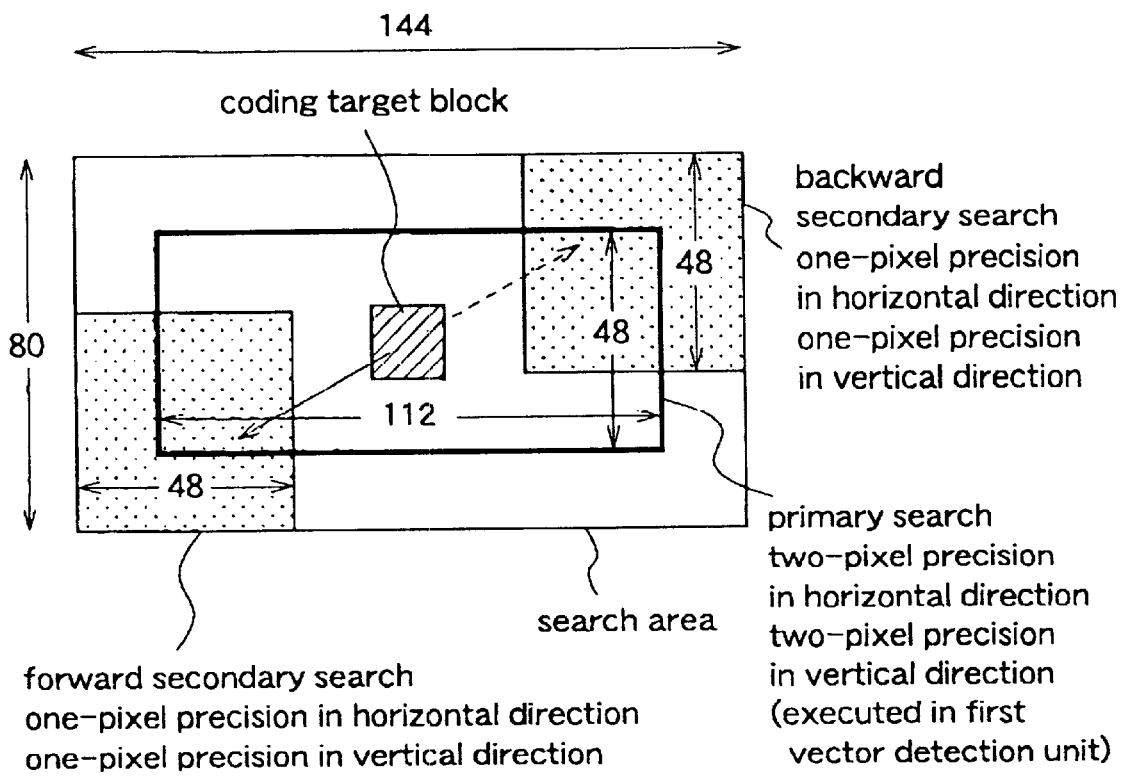
FIG. 6 is a diagram for explaining a search range for motion vector detection according to the second embodiment.

FIG. 6 shows an example of the two-step search. In the first vector detection unit 60, a search is performed as a preliminary primary search with lower precision, i.e., two-pixel precision in the horizontal direction and two-pixel precision in the vertical direction in a search range of 112 pixels×48 lines (±48 pixels in the horizontal direction and ±16 lines in the vertical direction). Thereafter, in the second vector detection unit 221a in the motion compensation unit 211, a search is performed as a secondary search with higher precision, i.e., one-pixel precision in both of horizontal and vertical directions in a search range of 48 pixels×48 lines (±16 pixels in the horizontal direction and ±16 lines in the vertical direction).

Figure 7:
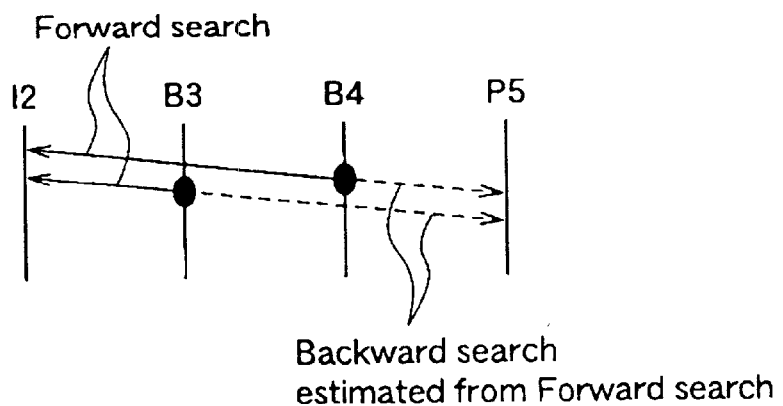
FIG. 7 is a diagram for explaining inter-frame motion compensation according to the second embodiment.
Figure 8:
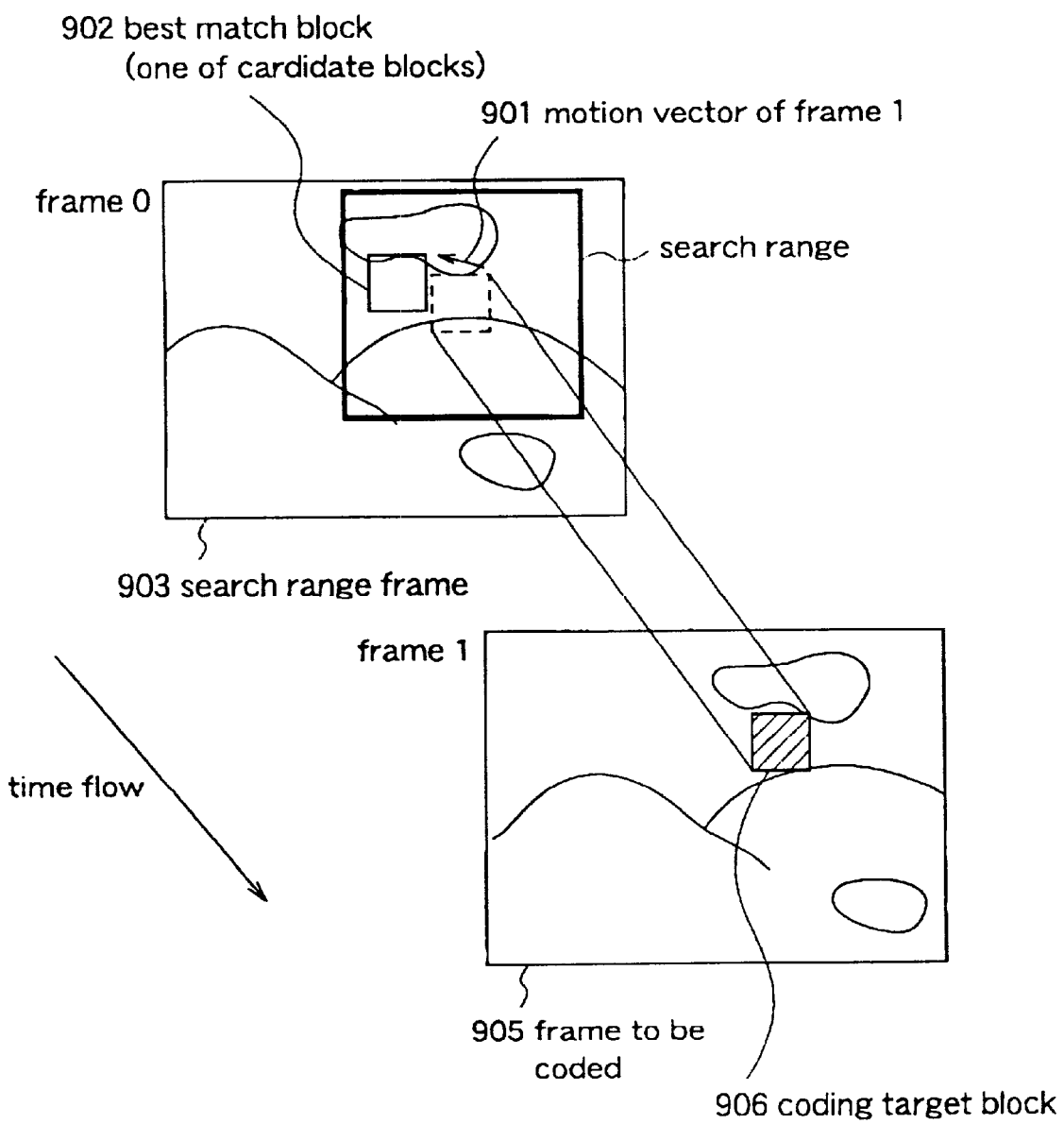
FIG. 8 is a diagram showing block matching.

FIG. 7 shows an example of an inter-frame search method. The primary search is a processing at the image input stage. Therefore, images which are retained in the image input unit 11 can be reduced by restricting the processing to the forward inter-frame prediction. When B3 in FIG. 7 is being input, P5 is not input yet but I2 is already subjected to the coding processing and stored in the search range frame memory. Therefore, the first search is executed by the forward inter-frame prediction although B3 is a B frame. Thereafter in the secondary search, the usual coding of B frame is executed by the motion compensation unit 211 on the basis of the motion vector obtained in the primary search in the coding order shown in FIG. 3. At that time, in the forward search, an area indicated by the first motion vector as the secondary search area is searched. Since the backward search is temporally opposite to the primary search, an area indicated by a motion vector which is symmetric to the first motion vector with respect to a point, as shown by broken lined arrows in FIGS. 6 and 7, is searched in the backward search.

The transfer amount of the search range according to the above processings is given by Expression 5.

((1920 pixels×1152 lines+

960 pixels×576 lines×2)×

30 frames/sec×8 bits/pixel)+

((1920 pixels×1152 lines)×

((112/2)pixels×(48/2)lines)/(16 pixels×16 lines)×30 frames/sec×8 bits/pixel)+((1920 pixels×1152 lines)×(48 pixels×

48 lines)/(16 pixels×16 lines)×

30 frames/sec×8 bits/pixel)×2

+((960 pixels×576 lines×2)×

30 frames/sec×8 bits/pixel)×

2=14 Gbps . . . bandwidth for the search range frame memory 40                          (Expression 5)

The first term of Expression 5 shows writing of a predicted image, the second term shows reading of the search range (predicted image) of the primary search (brightness components only), the third term shows reading of the search range (predicted image) of the secondary search (brightness components only), and the fourth term shows reading of color difference components of the predicted image. The multipliers 2 of the third and fourth terms in Expression 5 result from the bidirectional inter-frame prediction.

In the first embodiment, the bandwidth for the search range frame memory 40 in the case where HD images are processed is 49 Gbps. In this second embodiment, a wider search range is set previously in the first vector detection unit 60, and the motion vector detection is performed with prescribed lower precision. Thereafter, a search range narrower than that of this motion vector detection is set on the basis of a result of this detection and then the motion vector detection of higher precision is performed by the second vector detection unit 211*a* in the motion compensation unit 211, whereby the bandwidth from the search range frame memory 40 to the motion compensation unit 211 can be reduced to 14 Gbps. Accordingly, also when the throughput of image data is increased, the system cost can be reduced. Here, when the bus width of the first data bus is transferred in the data width of 64 bits, a required transfer frequency is approximately 300 MHz, including the overhead. This is a range which can be realized in the future.

Here, the vector detection which is performed by inputting a coding target block temporarily stored in the coding target frame memory 50 to the first vector detection unit 60 and using this coding target block may be considered. However, in this case, a new data bus for extracting data from the coding target frame memory 50 outside the chip should be provided or the data width of the second data bus should be expanded. Consequently, the number of data pins of the chip is increased, whereby the cost is increased. When the coding target block of the input image is input to the first vector detection unit 60 directly from the image input unit 11 on the same chip as in this second embodiment, additional data pins are not required, whereby an increase in the cost is suppressed.

Also in this second embodiment, like the first embodiment, when the search range frame memory 40 is integrated with the coding circuit 1 on one chip (LSI), a problem of an increased cost due to an increased number of data pins does not arise. Therefore, the data width can be easily expanded to 128 bits or 256 bits and thereby the transfer frequency can be reduced.

In this second embodiment, only the motion vector is supplied to the motion compensation unit 211 directly from the vector detection unit 60. However, there is no problem when the motion vector and an evaluation value of a candidate block corresponding to the motion vector are output to a control circuit such as a CPU (central processing unit) and this decision result is supplied to the motion compensation unit 211.

Embodiment 3

Figure 12:
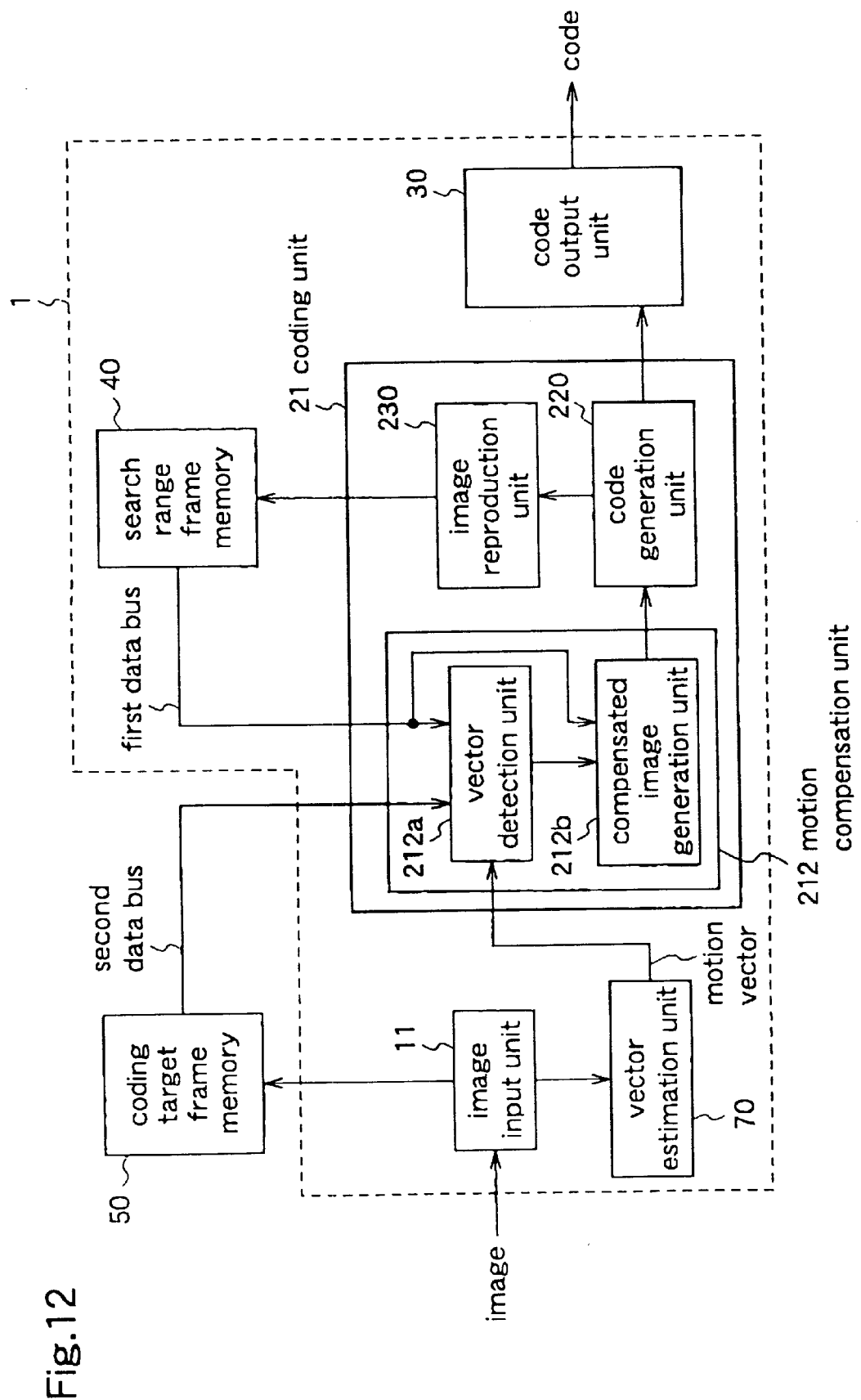
FIG. 12 is a block diagram illustrating the image coding apparatus of the third embodiment.

FIG. 12 is a block diagram illustrating an image coding apparatus according to a third embodiment of the present invention. In FIG. 12, the same reference numerals as those in FIG. 1 designate the same or corresponding parts.

An input image is subjected to the format transformation, filtering processing and the like by the image input unit 11 and thereafter written on the coding target frame memory 50 as well as input to a vector estimation unit 70. The vector estimation unit 70 detects a motion vector from continuous first and second frame images which are input directly from the image input unit 11, i.e., a frame to be coded which is a coding target frame image and its previous frame, and outputs the motion vector to the motion compensation unit 212. The motion compensation unit 212 comprises a vector detection unit 212*a* for performing motion vector detection and a compensated image generation unit 212*b* for generating a motion compensated image. The motion compensation unit 212 captures a search range from the search range frame memory 40 on the basis of the motion vector obtained by the vector estimation unit 70, performs the motion vector detection by the vector detection unit 212*a*, and generates a motion compensated image from a result of this detection and a frame image stored in the search range frame memory 40 by the compensated image generation unit 212*b*, whereby the motion compensation is performed. Other elements and their operations are the same as those in the first embodiment.

In this third embodiment, like the second embodiment, the transfer amount of data of the search range is reduced by the two-step search of previously calculating a motion vector at the input stage and obtaining a final motion vector by the motion compensation unit 212 according to the value of the motion vector. In the second embodiment, the data in the search range frame memory 40 is used as image data of the search range to be used in the calculation of the motion vector in the first step. On the other hand, in this third embodiment, data in the frame to be coded which is input directly from the image input unit 11 is used as image data of the search range to be used in the calculation of the motion vector in the first step. Accordingly, in the third embodiment, the data transfer amount can be reduced more than the image coding apparatus of the second embodiment.

FIGS. 9(*a*)–9(*c*) are diagrams schematically showing an operation of the vector estimation unit 70 of the image coding apparatus according to the third embodiment. FIG. 9(*a*) shows pixel values of some pixels in one line of a frame being presently coded, and absolute values of differences between these pixels and adjacent pixels. Here, assume that the pixel values are from 0 (minimum) to 9 (maximum) and points where the absolute values of the differences between adjacent pixel values are 7 or more are decided as change points. The change points are shown by black dots in the figure. FIG. 9(*b*) shows frequency distribution of the change points in each block, assuming that one block is composed of four pixels in FIG. 9(*a*). FIG. 9(*c*) shows frequency distribution of change points of a previous frame in the same position. An arrow in FIG. 9(*b*) shows that a block A having the frequency of 3 in the previous frame shown in FIG. 9(*c*) is moved rightward by one block in the present frame.

The vector estimation unit 70 obtains the differences between adjacent pixel values as shown in FIG. 9(*a*), obtains the frequency distribution of a frame image in prescribed block units, i.e., in four pixel units in this case, and checks in block units whether the pattern of the frequency distribution of a frame presently coded as shown in FIG. 9(*b*) and the pattern of the frequency distribution of the previous frame as shown in FIG. 9(c) match (pattern matching), whereby a motion vector is estimated. For example, the vector estimation unit 70 detects a motion of the block as shown by the arrow in FIG. 9(b) and estimates a motion vector from the detected motion.

Figure 10:
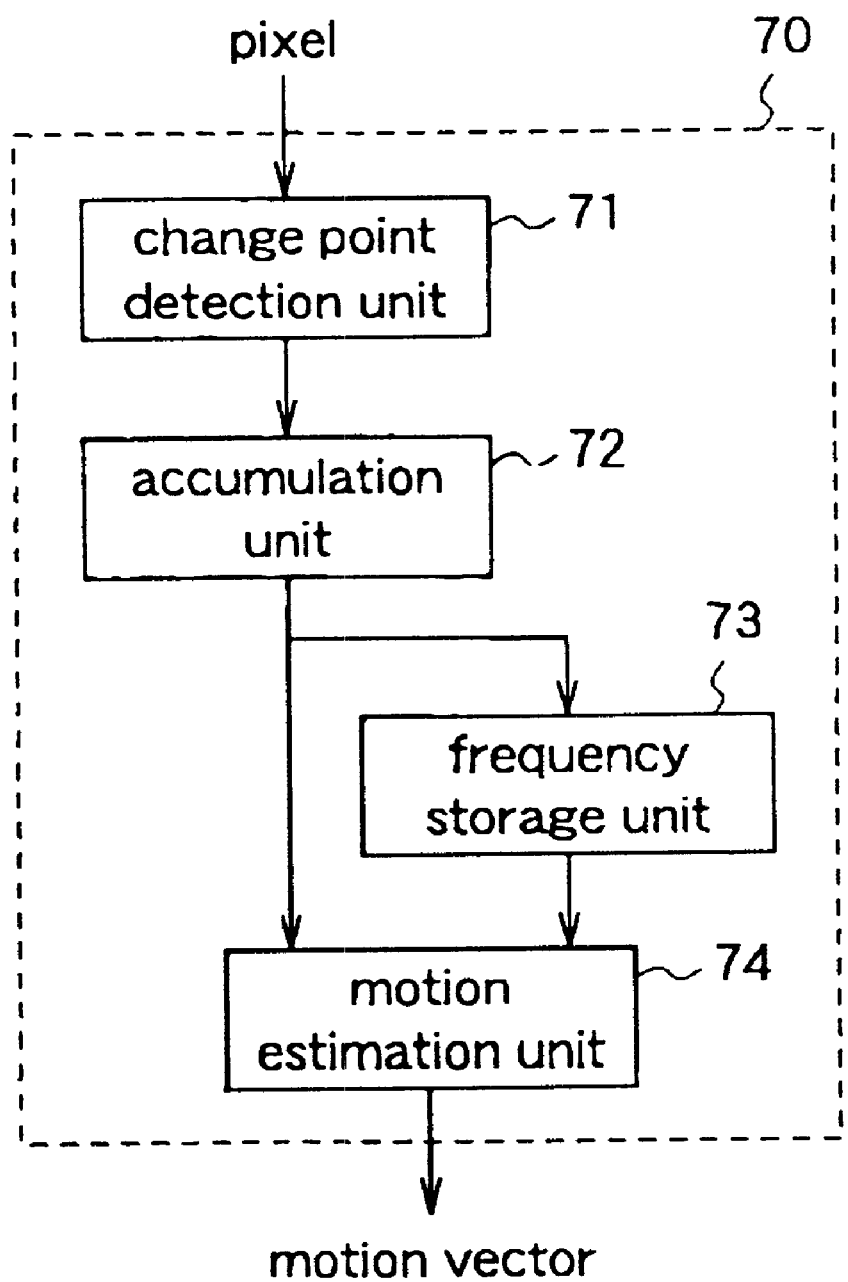
FIG. 10 is a block diagram illustrating the vector estimation unit of the image coding apparatus according to the third embodiment.

FIG. 10 is a block diagram illustrating a structure of the vector estimation unit 70. A change point detection unit 71 calculates an absolute value of a difference between a pixel value of a pixel input by the image input unit 11 and a pixel value immediately before. when the result is. larger than a preset threshold, the change point detection unit 71 recognizes that a change point is between these pixels and notifies an accumulation unit 72 of occurrence of the change point. The accumulation unit 72 calculates the frequency as the number of change points in one block which is composed of a prescribed number of pixels, and outputs the result to a frequency storage unit 73 as well as supplies the result to a motion estimation unit 74. The frequency storage unit 73 stores the frequencies of the change points in block units, which are output by the accumulation unit 72, for at least one frame. That is, the frequency storage unit 73 stores the frequencies of change points of respective blocks of the previous frame. The motion estimation unit 74 performs the pattern matching between the frequency distribution of the frame to be coded, which is input by the accumulation unit 72 and the frequency distribution of the previous frame, which is input by the frequency storage unit 73, obtains a similar block, and outputs a corresponding motion vector.

Figure 11:
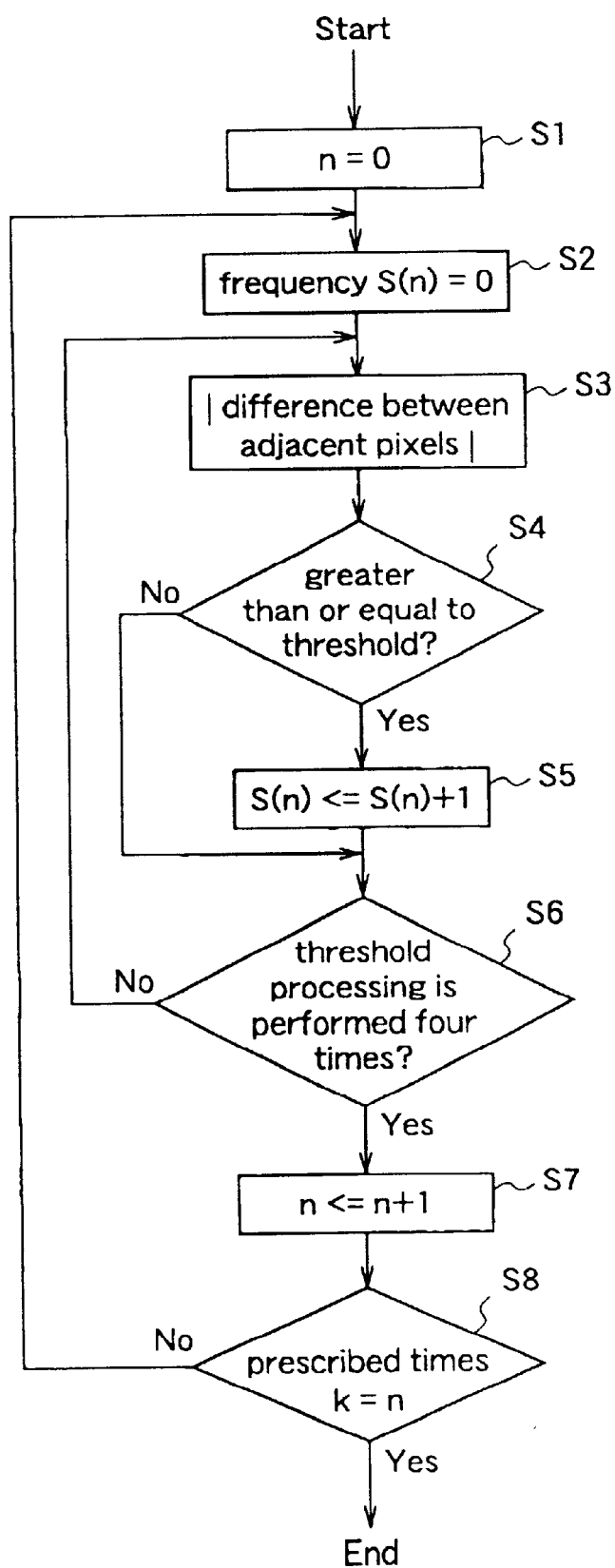
FIG. 11 is a flowchart for showing control of principle elements in the vector estimation unit of the image coding apparatus according to the third embodiment.

FIG. 11 is a flow chart for showing control by the change point detection unit 71 and the accumulation unit 72 of the vector estimation unit 70. In the figure, "n" designates a block number and "S(n)" designates the frequency of the block number "n". Hereinafter, a main operation of the vector estimation unit 70 will be described with reference to the figure. In this case, the description is given of a case where one block is composed of four pixels. However, the number of pixels in one block can be set to any number other than four.

Initially, when inputting of one frame is started, the block number n=0 is set as an initial value (step S1). Next, the frequency S(n)=0 is set for the block number (n) (step S2). Then, an absolute value of a difference between a pixel value of a pixel included in the block number "n" and its adjacent pixel value is calculated (step S3) and threshold processing of comparing the difference with a preset threshold is performed (step S4). When the difference is the threshold or larger, "1" is added to the frequency S(n), and when the difference is smaller than the threshold, the frequency S(n) is held (step S5). Then, decision of threshold processing times is performed for deciding whether the threshold processing is performed for all of the four pixels constituting one block, i.e., the threshold processing is performed four times (step S6). When the threshold processing times are less than four times, it is decided that the threshold processing for the respective pixels of one block is not finished, and it goes back to step S3. When the threshold processing times are four times or more, "1" is added to the block number "n" (step S7). Then, decision of prescribed times for comparing the block number "n" with a prescribed number of times corresponding to the number of blocks in one frame is performed (step S8). When the block number "n" is smaller than the prescribed number of times, it is decided that all blocks in one frame are not processed yet, and it goes back to step S1. When the block number "n" reaches the prescribed number of times, the processing is finished.

Next, the data amount transferred from the search range frame memory 40 in the image coding apparatus according to the third embodiment is given by Expression 6.

$$((1920 \text{ pixels} \times 1152 \text{ lines} + 960 \text{ pixels} \times 576 \text{ lines} \times 2) \times 30 \text{ frames/sec} \times 8 \text{ bits/pixel}) + ((1920 \text{ pixels} \times 1152 \text{ lines})) \times 48 \text{ pixels} \times 48 \text{ lines})/(16 \text{ pixels} \times 16 \text{ lines}) \times 30 \text{ frames/sec} \times 8 \text{ bits/pixel}) \times 2 + ((960 \text{ pixels} \times 576 \text{ lines} \times 2) \times 30 \text{ frames/sec} \times 8 \text{ bits/pixel}) \times 2 = 11 \text{ Gbps} \ldots \text{bandwidth for the search range frame memory } 40 \quad \text{(Expression 6)}$$

In this Expression 6, the second term of Expression 5, which corresponds to the reading of the image data in the search range output from the search range frame memory for the first step motion vector detection in the second embodiment is eliminated, and this Expression shows that the bandwidth is reduced from 14 Gbps to 11 Gbps.

According to this third embodiment, the same effects as those in the second embodiment can be obtained. Besides, since the vector estimation unit 70 obtains the motion vector from the frame to be coded which is input directly from the image input unit 11, without using the image data in the search range frame memory 40, the data transfer amount can be reduced more than the image coding apparatus of the second embodiment as well as the circuit scale can be reduced.

In this third embodiment, the search precision in the motion detection can be easily changed adaptively using the frequency of the change points. To be specific, a block having a high frequency of change points shows that its signals include high frequency components. Accordingly, it is desirable that this block is searched with search precision higher than a block having a low frequency. Therefore, when the frequency of change points is used as a type of information for the switching of the motion vector search and the search precision is changed according to the frequency, the motion detection of high precision and without waste can be realized.

In addition, in this third embodiment, only the motion vector is supplied from the vector estimation unit 70 to the motion compensation unit 212. However, the motion vector and an evaluation value of a candidate block corresponding to the motion vector can be output to a control circuit such as a CPU and its decision result can be supplied to the motion compensation unit 212.

In this third embodiment, the vector estimation unit 70 obtains the motion vector using the frequency distribution of change points which are accumulated for each block. However, in the present invention, the motion vector can be obtained by performing the pattern matching on the basis of the pixel values related to the change points, the absolute values of the differences between pixel values of the change points, or the coordinates of the change points.

Figure 13:
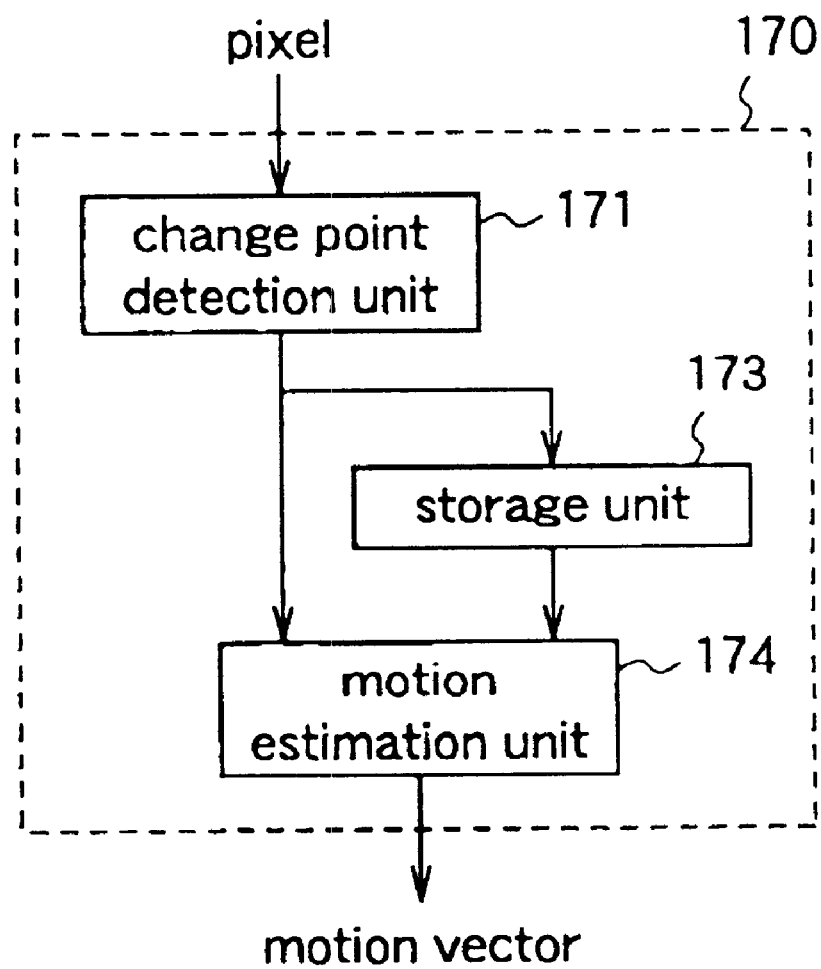
FIG. 13 is a block diagram illustrating a variation of the vector estimation unit of the image coding apparatus according to the third embodiment.

For example, in the image coding apparatus according to the third embodiment, a vector estimation unit 170 as shown in FIG. 13 can be replaced with the vector estimation unit 70. In this vector estimation unit 170, a change point detection unit 171 calculates an absolute value of a difference between a pixel value of a pixel input by the image input unit 11 and a pixel value immediately before. When the result is larger than a preset threshold, the change point detection unit 171 recognizes that a change point is between these pixels, and outputs coordinates of the change point and pixel values to a storage unit 173 as well as supplies the same to a motion estimation unit 174. The storage unit 173 stores respective change points and pixel values, which are output by the change point detection unit 171, for at least one frame. That is, the storage unit 173 stores the pixel values of the respective change points of a previous frame. The motion vector estimation unit 174 performs the pattern matching on the basis of the pixel values related to the change point of the present frame which are input by the change point detection unit 171 and the pixel values of all the change points of the previous frame which are input by the storage unit 173, obtains a similar change point, and outputs a corresponding motion vector. Also when this vector estimation unit 170 is utilized, the same effects as those in the third embodiment can be obtained.

In addition, in the vector estimation unit 170 as shown in FIG. 13, the absolute values of the differences between the pixel values of the change points obtained by the change point detection unit 171 can be supplied to the storage unit 173 and the motion estimation unit 174. Then, the motion vector estimation unit 174 can perform the pattern matching on the basis of the absolute value of the difference between pixel values of the change point in place of the pixel value of the change point, and output the motion vector. Also in this case, the same effects as those in the third embodiment can be obtained.

Further, in the vector estimation unit 170 as shown in FIG. 13, the coordinates of the change point obtained by the change point detection unit 171 can be supplied to the storage unit 173 and the motion estimation unit 174. Then, the motion vector estimation unit 174 can perform the pattern matching on the basis of the coordinates of the change point of the present frame, which are input by the change point detection unit 171 and the coordinates of all the change points of the previous frame, which are input by the storage unit 173, thereby obtaining the motion vector. Also in this case, the same effects as those in the third embodiment can be obtained.

What is claimed is:

1. An image coding apparatus which uses motion compensation inter-frame prediction comprising:

an image input unit;

a coding unit including a motion compensation unit for performing the motion compensation inter-frame prediction, a code generation unit for coding an output result of the motion compensation unit, and an image reproduction unit for reconstructing an image on the basis of a code generation result;

a code output unit for outputting a code generated by the coding unit;

a search range frame memory for containing the output of the image reproduction unit;

a coding target frame memory for containing frame data which is output by the image input unit;

a first data bus for performing data transfer from the search range frame memory to the coding unit; and a second data bus for performing data transfer from the coding target frame memory to the coding unit, and the motion compensation unit selecting a block in a search range, using the search range which is input from the search range frame memory via the first data bus and a coding target block which is input from the coding target frame memory via the second data bus, and performing the motion compensation.

2. The image coding apparatus of claim 1 wherein the motion compensation unit and the search range frame memory are integrated on one chip.

3. The image coding apparatus of claim 1 wherein a memory capacity of the coding target frame memory is larger than a memory capacity of the search range frame memory.

4. An image coding apparatus which uses motion compensation inter-frame prediction comprising:

an image input unit;

a spare vector detection unit;

a coding unit including a motion compensation unit for performing the motion compensation inter-frame prediction, a code generation unit for coding an output result of the motion compensation unit, and an image reproduction unit for reconstructing an image on the basis of a code generation result;

a code output unit for outputting a code generated by the coding unit;

a search range frame memory for containing the output of the image reproduction unit;

a coding target frame memory for containing frame data output by the image input unit;

a first data bus for performing data transfer from the search range frame memory to the spare vector detection unit and the coding unit; and a second data bus for performing data transfer from the coding target frame memory to the coding unit, and the spare vector detection unit selecting a block in a search range, using the search range which is input from the search range frame memory via the first data bus and a coding target block which is input by the image input unit, and calculating a motion vector, and the motion compensation unit selecting a block in a search range, using the search range which is input from the search range frame memory via the first data bus on the basis of the motion vector calculated by the spare vector detection unit and the coding target block which is input from the coding target frame memory via the second data bus, and performing the motion compensation.

5. An image coding apparatus which uses motion compensation inter-frame prediction comprising:

an image input unit;

a vector estimation unit;

a coding unit including a motion compensation unit for performing the motion compensation inter-frame prediction, a code generation unit for coding an output result of the motion compensation unit, and an image reproduction unit for reconstructing an image on the basis of a code generation result;

a code output unit for outputting a code generated by the coding unit;

a search range frame memory for containing the output of the image reproduction unit;

a coding target frame memory for containing frame data output by the image input unit;

a first data bus for performing data transfer from the search range frame memory to the coding unit; and a second data bus for performing data transfer from the coding target frame memory to the coding unit, and the vector estimation unit calculating a motion vector from continuous first and second frame images which are successively input by the image input unit, and the motion compensation unit selecting a block in a search range, using the search range which is input from the search range frame memory via the first data bus on the basis of the motion vector calculated by the vector estimation unit and a coding target block of the second frame image which is input from the coding target frame memory via the second data bus, and performing the motion compensation.

6. The image coding apparatus of claim 5 wherein the vector estimation unit comprises:
- a change point detection unit for detecting a change point from absolute values of differences between continuous pixels in each of the first and second frame images;
- an accumulation unit for accumulating the numbers of change points;
- a frequency storage unit for containing the accumulation result for the first frame image of the accumulation unit; and
- a motion vector detection unit for detecting a motion vector on the basis of the accumulation result for the second frame image of the accumulation unit and the accumulation result for the first frame image, which result is stored in the frequency storage unit.

7. The image coding apparatus of claim 5 wherein the vector estimation unit comprises:
- a change point detecting unit for detecting a change point from absolute values of differences between continuous pixels in each of the first and second frame images;
- a change point storage unit for containing pixel values of pixels related to the change point of the first frame image; and
- a motion vector detection unit for detecting a motion vector on the basis of pixel values of pixels related to the change point of the second frame image, detected by the change point detection unit, and the pixel values of the pixels related to the change point of the first frame image, stored in the change point storage unit.

8. The image coding apparatus of claim 5 wherein the vector estimation unit comprises:
- a change point detection unit for detecting a change point from absolute values of differences between continuous pixels in each of the first and second frame images;
- a change point storage unit for containing an absolute value of a difference between pixels, which is related to the change point of the first frame image; and
- a motion vector detection unit for detecting a motion vector on the basis of an absolute value of a difference between pixels, which is related to the change point of the second frame image, detected by the change point detection unit, and the absolute value of the difference between pixels, which is related to the change point of the first frame image, stored in the change point storage unit.

9. The image coding apparatus of claim 5 wherein the vector estimation unit comprises:
- a change point detection unit for detecting a change point from absolute values of differences between continuous pixels in each of the first and second frame images;
- a change point storage unit for containing coordinates of the change point of the first frame image; and
- a motion vector detection unit for detecting a motion vector on the basis of coordinates of the change point of the second frame memory, detected by the change point detection unit, and the coordinates of the change point of the first frame memory, stored in the change point storage unit.

10. A motion vector detection method which is used in motion compensation inter-frame prediction, comprising:

performing first motion vector detection using an input coding target block and a search range which is set for the coding target block in a frame image obtained according to the motion compensation inter-frame prediction, with predetermined search precision; and performing second motion vector detection using the coding target block which is temporarily stored after being input and a search range which is set in the frame image obtained according to the motion compensation inter-frame prediction on the basis of a motion vector detected by the first motion vector detection, with higher search precision than the predetermined search precision.

11. A motion vector detection method which is used in motion compensation inter-frame prediction comprising:

estimating a motion vector from continuous first and second frame images which are successively input; and detecting a motion vector using a coding target block in the second frame image, which block is temporarily stored after being input, and a search range which is set in a frame image obtained according to the motion compensation inter-frame prediction on the basis of the motion vector detected by the estimation of the motion vector.

12. The motion vector detection method of claim 11 wherein the estimation of the motion vector is performed by:
- detecting a change point of pixels from absolute values of differences between continuous pixels in each of the first and second frame images;
- accumulating the numbers of change points;
- storing the accumulation result for the first frame image; and
- detecting a motion vector on the basis of the accumulation result for the second frame image and the stored accumulation result for the first frame image.

13. The motion vector detection method of claim 11 wherein the estimation of the motion vector is performed by:
- detecting a change point of pixels from absolute values of differences between continuous pixels in each of the first and second frame images;
- storing pixel values related to the change point for the first frame image; and
- detecting a motion vector on the basis of pixel values related to the change point which is detected for the second frame image and the stored pixel values related to the change point of the first frame image.

14. The motion vector detection method of claim 11 wherein the estimation of the motion vector is performed by:
- detecting a change point of pixels from absolute values of differences between continuous pixels in each of the first and second frame images;
- storing an absolute value of a difference of pixels, which is related to the change point of the first frame image; and
- detecting a motion vector on the basis of an absolute value of a difference of pixels, which is related to the change point detected for the second frame image and the stored absolute value of the difference of the pixels, which is related to the change point of the first frame image.

15. The motion vector detection method of claim 11 wherein the estimation of the motion vector is performed by:
  detecting a change point of pixels from absolute values of differences of continuous pixels in each of the first and second frame images;
  storing coordinates of the change point of the first frame image; and
  detecting a motion vector on the basis of coordinates of the change point detected for the second frame image and the stored coordinates of the change point of the first frame image.

\* \* \* \* \*